United States Patent
Close et al.

(10) Patent No.: US 9,745,843 B1
(45) Date of Patent: Aug. 29, 2017

(54) METHOD FOR DETERMINING POSITION WITH IMPROVED CALIBRATION

(71) Applicant: NORALIS LIMITED, Cheltenham, Glos (GB)

(72) Inventors: David Close, Austin, TX (US); George W. Troy, Loomis, CA (US)

(73) Assignee: NORALIS LIMITED, Cheltenham, Glos (GB)

( * ) Notice: Subject to any disclaimer, the term of this patent is extended or adjusted under 35 U.S.C. 154(b) by 0 days.

(21) Appl. No.: 15/178,178

(22) Filed: Jun. 9, 2016

(51) Int. Cl.
*E21B 44/00* (2006.01)
*G01D 5/24* (2006.01)
*E21B 7/04* (2006.01)
*E21B 47/024* (2006.01)
*E21B 47/06* (2012.01)
*E21B 47/00* (2012.01)

(52) U.S. Cl.
CPC ............. *E21B 44/00* (2013.01); *E21B 7/04* (2013.01); *E21B 47/024* (2013.01); *E21B 47/065* (2013.01); *G01D 5/24* (2013.01); *E21B 47/00* (2013.01)

(58) Field of Classification Search
None
See application file for complete search history.

(56) References Cited

U.S. PATENT DOCUMENTS

| | | |
|---|---|---|
| 5,880,680 A | 3/1999 | Wisehart |
| 6,206,108 B1 | 3/2001 | MacDonald et al. |
| 6,648,082 B2 | 11/2003 | Schultz et al. |
| 7,168,507 B2 | 1/2007 | Downton |
| 7,234,540 B2 | 6/2007 | Estes et al. |
| 8,818,779 B2 | 8/2014 | Sadlier et al. |
| 2004/0255671 A1 | 12/2004 | Le Roy |
| 2005/0224257 A1 | 10/2005 | Ekseth et al. |
| 2007/0272442 A1* | 11/2007 | Pastusek ............... E21B 21/08 175/40 |
| 2009/0194333 A1 | 8/2009 | MacDonald |
| 2010/0078216 A1 | 4/2010 | Radford et al. |
| 2013/0239650 A1* | 9/2013 | Chau .................... G01P 15/08 73/1.38 |
| 2014/0231141 A1 | 8/2014 | Hay et al. |
| 2015/0168176 A1 | 6/2015 | Wu |

FOREIGN PATENT DOCUMENTS

CA  2615392 A1  2/2005

* cited by examiner

*Primary Examiner* — Leon-Viet Nguyen
(74) *Attorney, Agent, or Firm* — Andrew W. Chu; Craft Chu PLLC (57) ABSTRACT

The method and system for determining position with improved calibration allows a device to initiate activity at the proper location, such as navigating a drill bit through a rock formation. A position sensor having an oscillation element with a range of displacement in a set direction according to gravity generates a position data signal based on an amount of displacement in the set direction. A temperature sensor detects temperature and duration of the temperature. A plastic bias value is determined by a processor module based on the temperature data signal, the duration of the temperature, and the position data signal so as to account for bias and hysteresis errors. A position value is set according to the plastic bias value so that the position value is more accurate. The activity of the terminal device is initiated or maintained according to the position value calibrated by the plastic bias value.

19 Claims, 2 Drawing Sheets

METHOD FOR DETERMINING POSITION WITH IMPROVED CALIBRATION

CROSS-REFERENCE TO RELATED APPLICATIONS

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to determining position of a tool for operations at a location of the tool. In particular, the present invention relates to calibrating sensors for determining position of the sensors. Even more particularly, the present invention relates to calibrating sensors on a downhole tool to more accurately determine position of the downhole tool in an underground formation, such that setting location of activity or operations, such as drilling by the downhole tool, is more accurate.

2. Description of Related Art Including Information Disclosed Under 37 CFR 1.97 and 37 CFR 1.98.

Sensors to determine position are used in a tremendous number of important processes, such as deployment of vessels in space, movement of a video game controller, and injection of cells in a tumor. On large scales and small scales, determining position for operations at the determined position can be very important. Accurate sensors are crucial for the performance of those activities. Sensors are also known to direct oil and gas operations in a rock formation. The direction of the tool and the location of the wellbore are detected, so that the various downhole activities can be accurately placed in the formation. These downhole activities include drilling, injecting, and isolating zones in the formation. The accuracy of the sensor and placement of a wellbore can seriously affect the outcome of a drilling operation.

Sensors are calibrated to increase the amount of accuracy and precision so that the determination of position is also as accurate and precise as possible. Sensors in extreme environmental conditions are subject to error, due to those conditions, such as high temperatures. The environment of a sensor can include the depth, pressure and heat in a wellbore. Alternative environments for accelerometers also include high temperatures from electronic components in a circuit board of a video game controller, re-entry heat in orbit, and elevated temperatures from radiation treatment in cellular tissue In the prior art, redundancy is used for increasing accuracy. U.S. Pat. No. 6,206,108, issued to MacDonald, et al. on Mar. 27, 2001, teaches a method for adjusting a drilling operation based on a system with multiple sensors to measure multiple parameters. The sensors correct each other, and each sensor measurement further refines an instrument reading downhole. In U.S. Patent Application No. 2010/0078216, published for Radford, et al. on Apr. 1, 2010, a system and method for downhole vibration monitoring for reaming tools includes a plurality of accelerometers, a plurality of magnetometers, and at least one temperature sensor. The plurality of accelerometers corrects or verifies other sensors to guide drilling. U.S. Pat. No. 6,648,082, issued to Schultz, et al. on Nov. 18, 2003, teaches a method for differential sensor measurement and a system to detect drill bit failure. The system incorporates a main sensor and individual sensors for other sensor values, which are compared to each other to create a self-correcting system.

The prior art further establishes mathematical models to increase accuracy. U.S. Pat. No. 8,818,779, issued to Sadlier, et al. on Aug. 26, 2014, teaches a system and method for real-time wellbore stability while drilling a borehole. The drilling operation is adjusted in real time according to sensor readings compared against a geomechanical model. U.S. Patent Application No. 2014/0231141, published for Hay, et al. on Aug. 21, 2014, discloses a system and method for automatic weight on bit sensor correction with a sensor arranged in a bottomhole assembly. The method comprises first taking a survey recording an initial depth within a borehole, calculating a prediction borehole curvature at a second depth, calculating a weight correction value based on the predicted hole curvature, and finally adjusting the borehole position with the weight correction value.

Adjusting for accuracy in the prior art focuses on external factors and conditions affecting readings, not the sensor itself. The mathematic models apply to a specific context for drilling operations, not the general accuracy and precision of the sensor. In a different context for a different activity (deep space, microsurgery), there is still a need to calibrate according to the components of the sensor itself.

The factory calibration of a sensor is addressed in the prior art. Upon assembly, the components of the sensor are calibrated before applied in a specific context with other distorting external conditions. U.S. Pat. No. 5,880,680, issued to Wisehart, et al. on Mar. 9, 1999, teaches calibration of a sensor according to a temperature model. One accelerometer is tested at the time of manufacture to determine a temperature model of how accuracy of the accelerometer is affected at different temperatures. In the drilling operation, a temperature sensor and the accelerometer are run in the wellbore, and the readings of the accelerometer and the readings from the temperature sensor are processed according to the temperature model. U.S. Pat. No. 7,234,540, issued to Estes, et al. on Jun. 26, 2007, teaches a system and method of a two-axis gyroscope and other sensors which, when incorporated into a bottomhole assembly, determines the direction of the wellbore and drilling tool in real-time. A number of corrective operations are applied to the sensors while downhole, including a scale factor correction for the temperature at the final position.

The prior art general calibration requires numerous measurements taken over many sensor orientations and temperatures, and the prior art methods only account for temperature affecting components of the sensors. However, temperature is not the only factor, especially for certain types of sensors.

More modern accelerometers are small micro electro-mechanical systems (MEMS or micro-mechanical systems, MMS). One of the most simple and less expensive MEMS devices is an open loop MEMS device, which basically consists of a hinged micro machined silicon wafer. The silicon wafer is the sensing element that moves in the presence of a gravitational field or acceleration force. The open loop MMS sensor measures the departure from a neutral starting position of the wafer. Another MEMS device is a closed loop MEMS device basically consisting of a cantilever beam, such as a cantilever beam, and a proof mass on the beam. The cantilever beam can be maintained in a neutral zero force position by applying a current flow through a small magnetic element, which creates the exact force to neutralize the gravitational force acting on the cantilever beam. An additional amount of current is applied proportionally to the gravitational field vector being measured in a particular orientation as required to keep the cantilever beam in the neutral position. A magnetic force induced by the electric current returns the cantilever beam to the start or neutral position. Thus, by measuring the amount of current to return the cantilever beam to the neutral force position, the amount of acceleration force or gravitational force can be measured. The present invention is applicable to both open loop and closed loop sensors. There is particular utility for open loop sensors with the present invention.

The errors from MMS sensors can originate from bias and hysteresis type distortion. Bias error happens because the cantilever beam is deformed by high temperatures and cannot return to the same neutral/null position with the same current induced magnetic force. Hysteresis type distortion happens because the amount of deformation of the cantilever beam by high temperatures relates to the time spent at the high temperatures. The physical component, such as the silicon wafer and cantilever beam, further deforms from being exposed to the repeated higher and lower temperatures for different amounts of time. These components of the MEMS accelerometer are affected by additional errors, besides the temperature itself. The long term effects of high temperature are not addressed in the current calibration methods, which have particularly high impact on MEMS accelerometers.

Bias errors and hysteresis errors are known for prior art accelerometers. The '540 patent also includes a bias correction, which is obtained from a prior survey; and misalignment and gravity dependent corrections to the gyroscope axes. Use of a sensor will have bias errors, as the components drift when the sensor is in use. However, the MMS sensors, in particular open loop MMS sensors, are more susceptible to bias errors and hysteresis errors, especially with exposure to high temperatures over extended periods of time. MMS sensors can be calibrated according to the prior art, including attempts at bias correction; however, the prior art for regular accelerometers does not address MMS sensors, which are more prone to these errors than regular accelerometers. The sensitivity and durability for the components of MMS sensors are not the same as traditional accelerometers. The old solutions for error of the prior art can apply to MMS sensors, but those old solutions are not sufficient for reliability. Additional solutions are required for the MMS sensors to be used repeatedly in high temperature conditions.

The accuracy problem of MMS sensors is known, and the shortcomings of a factory temperature model calibration is also known. U.S. Pat. No. 7,168,507, issued to Downton on Jan. 30, 2007, teaches a system and method for recalibrating downhole sensors by comparing output values of two sets of sensors. The first set of sensors is inexpensive and comprised of less accurate MMS sensors, so they are placed close to the drill bit with a high risk of damage. The second set of sensors is expensive and placed in a more stable remote location. The second set of sensors are accelerometers measuring the same parameters, when the second set arrives at the same location where the first set took measurements. The first set of MMS sensors are calibrated by the readings from the second set. Instead of solving the reliability problem of the MMS sensors, the prior art solution is to retain a second set of the more expensive accelerometers to double check the MMS sensors. The '507 patent acknowledges the known error rate of inexpensive MMS sensors, but the solution of adding a second expensive set of more accurate sensors remains expensive and redundant.

It is an object of the present invention to provide a method for determining position with improved calibration.

It is another object of the present invention to provide a method for determining position of a tool or a terminal device at a location for initiating activity.

It is still another object of the present invention to provide a method for initiating activity at a particular location determined by a calibrated sensor.

It is an object of the present invention to calibrate a sensor.

It is another object of the present invention to calibrate an MMS sensor.

It is still another object of the present invention to calibrate an MMS sensor for a bias correction.

It is yet another object of the present invention to calibrate an MMS sensor for a hysteresis correction.

It is another object of the present invention to provide a method for determining position with improved calibration of an MMS sensor.

It is still another object of the present invention to provide a method for initiating activity at a particular location determined by a calibrated MMS sensor.

It is an object of the present invention to provide a method for generating a plastic bias value for calibrating an MMS sensor.

It is another object of the present invention to provide a method for determining a plastic bias value based on temperature, time duration at a temperature, and gravity.

It is an object of the present invention to calibrate a sensor after a factory calibration of the sensor.

It is an object of the present invention to calibrate a sensor with a plastic bias value concurrently with a factory calibration of the sensor.

It is an object of the present invention to continuously calibrate a sensor with an adjusted plastic bias value.

It is another object of the present invention to provide a method for determining position with a continuous calibration of an MMS sensor.

It is still another object of the present invention to provide a method for initiating and maintaining activity at particular locations determined by a continuously calibrated MMS sensor.

These and other objectives and advantages of the present invention will become apparent from a reading of the attached specification.

BRIEF SUMMARY OF THE INVENTION

Embodiments of the present invention include the method and system for determining position with improved calibration. Any device requiring accurate position data can determine location of the device with a sensor calibrated according to the present invention. The location and orientation of the device can be more accurately detected, so that the device can initiate or maintain activity in the desired location and orientation. Furthermore, the position data can be calibrated in real time so that a device can be actively guided, such as navigating a drill bit, while drilling through a rock formation.

The method of the present invention includes assembling a position sensor comprised of an oscillation element having a range of displacement in a set direction according to gravity. The position sensor can be an accelerometer of MMS sensor. One embodiment includes the position sensor being an MMS sensor exposed to high temperature conditions. A position data signal is generated based on an amount of displacement in the set direction, and a temperature data signal is detected by a temperature sensor in proximity to the position sensor. The position data signal and temperature data signal are communicated to a processor module in communication with the position sensor and the temperature sensor. A position value is generated by the processor module based on the position data signal, the temperature data signal, and duration of a temperature of the temperature data signal. The position value is based on temperature and gravitational force, including how long the position sensor is exposed to the temperature conditions. The data signals and values are stored in memory module. The position value is communicated to the terminal device so that activity of the terminal device corresponds to the position value.

The step of generating the position value further comprises generating a plastic bias value to set the position value, so that the position value accounts for bias and hysteresis errors and improves accuracy of the position value. The plastic bias value relates the temperature data signal, the duration of the temperature, and the position data signals, according to bias and hysteresis of the oscillation element of the position sensor. The method accounts for the bias error of the component of each position sensor, relative to temperature, the hysteresis error of the component of each position sensor, relative to duration of temperature. In the present invention, the position data signal can correspond to measurement of gravity or gravitational field on the oscillation element of the position sensor. The readings from the position sensor are corrected by the plastic bias value to set the position value with more accuracy.

Embodiments of the present invention include incorporating an initial or factory calibration of the position sensor before the step of generating the position data signal for the position value corrected by the plastic bias value. The position sensor is raised to an initial temperature for an initial amount of time so as to generate an initial position data signal. The position sensor is raised to the initial temperature again, and the position data signal is compared to the initial position data signal to determine an error amount. The steps can be repeated for different initial temperatures and different initial amounts of time. A calibration model is compiled so that other position sensors from the same batch can be used with the calibration model. Alternatively, the method of the present invention is concurrent with the initial or factory calibration of the position sensor. The initial temperature for the initial amount of time and the initial position data signal become the first run of the method of the present invention with the first temperature for the first duration and the first position data signal for the generation of the position value set by the plastic bias value. Another calibration model further including the additional plastic bias value corrections can also be compiled so that other position sensors from the same batch as the position sensor can be deployed.

The present invention can be continuous, unlike prior art sensors with only an initial or factory calibration. The step of generating the position data signal and setting the position value according to a plastic bias value can be repeated over and over. Alternatively, the step of generating the position data signal and setting the position value can comprise generating a plurality of the data signals and setting the corresponding plurality of position values according to the respective plurality of plastic bias values.

Embodiments of the system of the present invention include the position sensor, the temperature sensor, processor module, memory module and terminal device. The terminal device can be any device requiring position data for operation, such as a downhole tool in the oil and gas industry, a survey tool for mapping locations, or a mobile probe for tracking location of the sensor or a video game controller for translating movements into game action. The present invention can include any terminal device that uses location and orientation data. In some embodiments, the position sensor can be an MMS sensor exposed to high temperatures. The system can also include another position sensor generating another position data signal and another position value adjusted according to another plastic bias value. The multiple sensor embodiment can further reduce errors and confirm accuracy of location and orientation. The system can also include at least one magnetometer in proximity to the temperature sensor. The field data signals from the magnetometer can be used to determine calculated parameters, such as compass azimuth and the earth's magnetic dip. These parameters use both the field data signals as magnetometer magnetic signals and position data signals as accelerometer gravitational signals, such that these parameters can also be improved with the plastic bias value of the present invention.

DETAILED DESCRIPTION OF THE INVENTION

Figure 1:
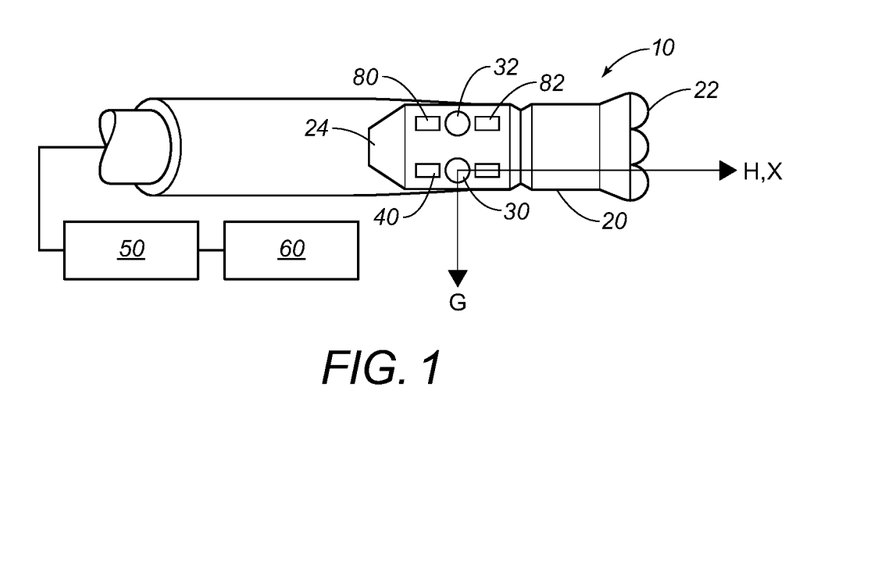
FIG. 1 is a schematic view of the system of the present invention, showing the terminal device as a drilling and activity as drilling in a first orientation.
Figure 2:
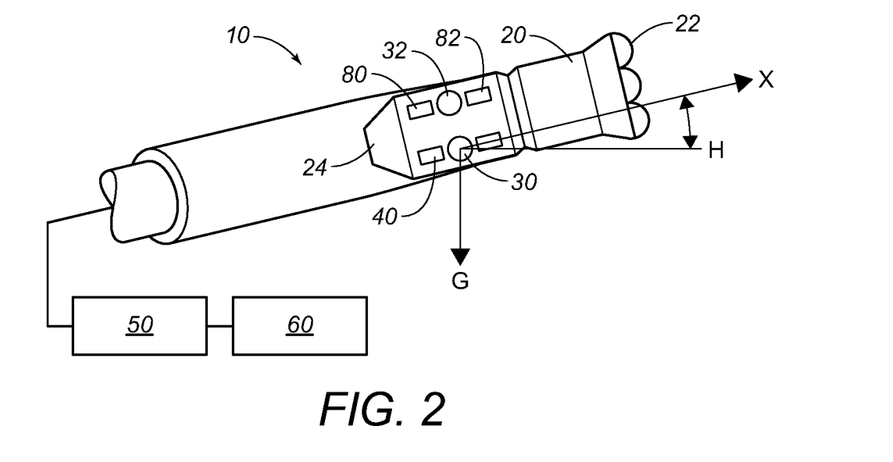
FIG. 2 is another schematic view of the system of the present invention, showing the terminal device as a drilling and activity as drilling in a second orientation.
Figure 3:
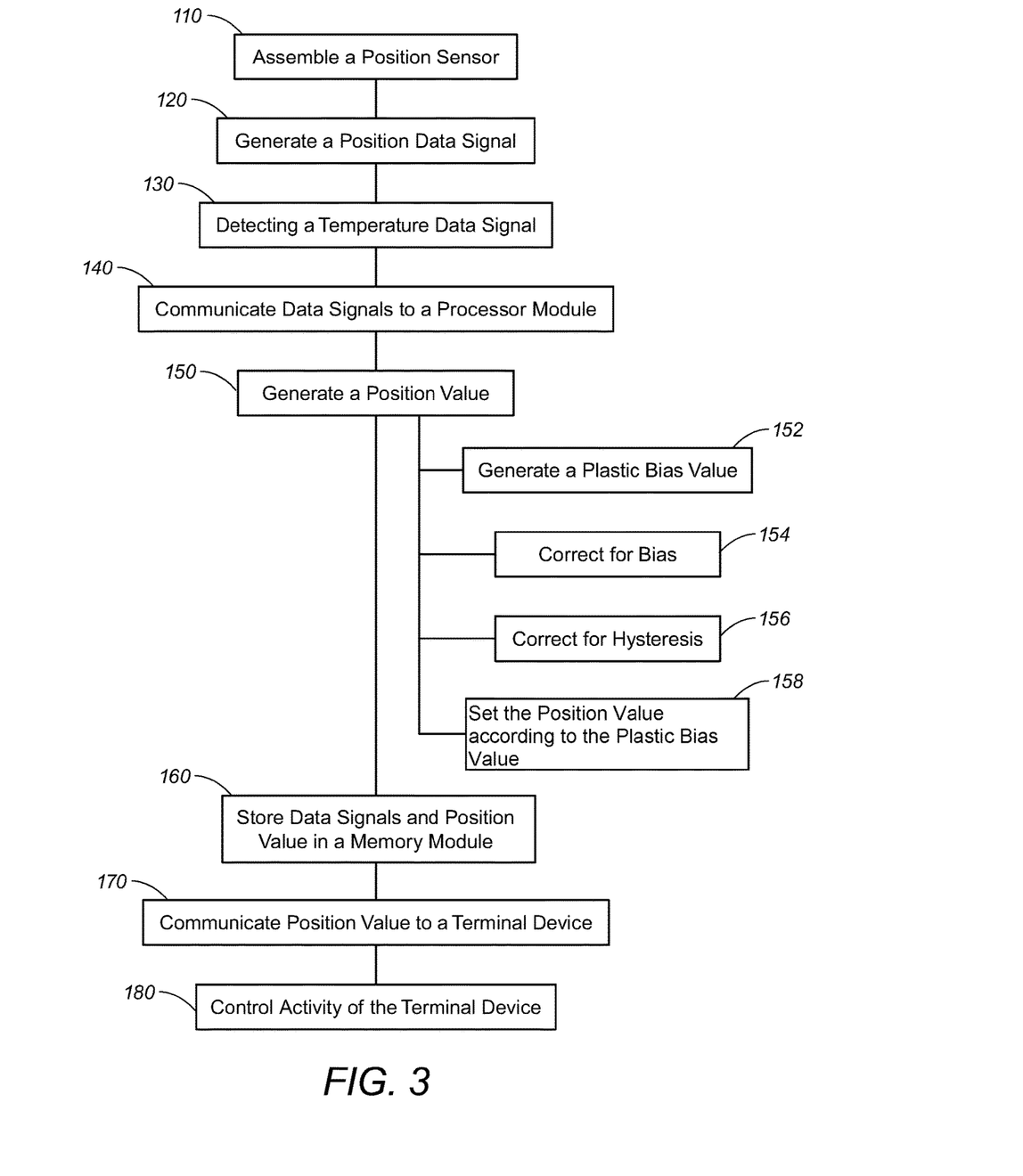
FIG. 3 is a flow diagram of an embodiment of the method of the present invention.

Referring to FIGS. 1-3, the present invention includes the method and system 10 for determining position of a device 20 with improved calibration of a position sensor 30 of the device. The location and orientation of the device 20 are more accurate with the present invention. The position sensor 30 calibrated according to the present invention allows the device 20 to properly initiate or maintain activity in the intended location and orientation. When calibrated in real time, the device 20 can be actively guided, such as navigating a drill bit 22, while drilling through a rock formation. Errors due to bias and hysteresis can be reduced by the method and system of the present invention. Previous sensors with large bias and hysteresis errors, such as MMS sensors exposed to high temperatures, in particular open loop devices, can now be incorporated into devices for reliable determination of position data.

The method of the present invention includes assembling a position sensor 110 comprised of an oscillation element having a range of displacement in a set direction according to gravity. The position sensor can be an accelerometer or MMS sensor. One embodiment includes the position sensor being an MMS sensor exposed to high temperature conditions. Each position sensor is comprised of an oscillation element having a range of displacement in a set direction according to gravity. The position sensors can be accelerometers or MMS sensors. One embodiment includes each position sensor being an MMS sensor exposed to high temperature conditions with an oscillation element, such as the silicon wafer of an open loop sensor system or a cantilever beam of a closed loop sensor system. The wafer or cantilever beam is affected by gravity or acceleration forces, so there is an amount of displacement of the wafer or an amount of current in a particular orientation required to keep the cantilever beam in place. Thus, the amount of displacement determined by capacitance measurements of the wafer or the amount of current and direction of current reveals the amount and direction of acceleration. The errors from this type of MMS sensor can originate from bias and hysteresis type distortion. Bias error happens because the oscillation element (wafer or cantilever beam) is deformed by high temperatures and cannot return to the same neutral/null position with the same voltage. Hysteresis type distortion happens because of a latency and physical/chemical sticking in the oscillation element's ability to fully react to a temperature fluctuations and reversals. The oscillation element further deforms from being exposed to the repeated higher and lower temperatures for different amounts of time.

A position data signal is generated 120 based on an amount of displacement of the oscillation element in the set direction. In the embodiments with the wafer and cantilever beam, each position data signal corresponds to the measurement of gravity on the wafer or the cantilever beam, respectively. The capacitance measurement of the displacement of the silicon wafer can determine the position data signal for location and orientation for an open loop system. The current required to maintain the cantilever beam can determine the position data signal for location and orientation for a closed loop system. This position data signal is not a true position value, so the position data signal requires correction to a more accurate position value because the bias and hysteresis errors affect the reliability of these sensor readings. The prior art calibrations correct for temperature distortions, but not distortions due to changes in the components of the sensor themselves. When delicate components, such as oscillation elements in MMS sensors, are assembled for compact size, lower costs, and lighter weights of the position sensor, the prior art calibrations fail to adequately correct the position value. The smaller, lighter, and cheaper positions sensors cannot be used in devices that require high levels of accuracy with only prior art calibration.

In the method of the present invention, a temperature data signal is detected 130 by a temperature sensor in proximity to the position sensor. The device will have both the position sensor and temperature sensor exposed to the same conditions, such as the same temperatures. The position data signal and temperature data signal are communicated to a processor module 140 in communication with the position sensor and the temperature sensor. The sensors and processor module can be connected so that data can be exchanged between these components. There is also a memory module in communication with the processor module.

The processor module generates a position value 150 based on the position data signal, the temperature data signal, and duration of a temperature of the temperature data signal. The position value can account for temperature distortions, bias distortions and hysteresis distortions. The amount of time the position sensor is exposed to the temperature of the temperature data signal is used to determine the position value. The present invention includes more than the temperature alone to set the position value of the device.

Next, the position data signal, the temperature data signal, duration of the temperature and the position value are stored in the memory module 160, and the position value is communicated to the device 170 so that activity of the device can correspond to the position value. When the position of the device is accurately determined, the activity can be initiated 180 in the correct place. In the example of the drill bit as the device or terminal device, drilling with the drill bit at the accurate location in the rock formation is very important for placing the wellbore in the right location for access to production zones in the rock formation. Missing the location has serious consequences for the success of the hydrocarbon production. In the example of the video game controller, the motion of the controller must correspond accurately to movement on the video display. In the example of a mobile phone, the location of the mobile device must be accurate for tracking movement of the mobile device.

Embodiments of the step of generating the position value of the present invention further comprise generating a plastic bias value 152 to correct the position data signal. The plastic bias value relates the temperature data signal, the duration of the temperature, and the position data signal, according to bias and hysteresis of the oscillation element of the position sensor. The method accounts for the bias error of these mechanical components of each position sensor 154, affected by exposure to temperature, and for the hysteresis error of these mechanical components of each position sensor 156, affected by duration and fluctuation of exposures to the temperature conditions. The position data signal is adjusted so that the plastic bias value 158 can set a position value that is more accurate.

For a linear sensor, a prior art sensor calibration might be described by equation:

$$CAL=[RAW*SCALE(t)]-BIAS(t) \qquad \text{(Equation 1)}$$

wherein CAL is the prior art calibrated sensor reading or prior art position value, wherein RAW is the original sensor reading or position data signal, SCALE(t) is a scale factor that is a function of temperature, and BIAS(t) is a bias factor that is a function of temperature. In the case of this prior art calibration, SCALE(t) and BIAS(t) can be determined by experimentation before the sensor is put into use. The prior art calibration is the factory calibration after the sensors are assembled.

For the present invention, the step of generating the position value is described by:

$$CAL=[RAW*SCALE(t)]-BIAS(t) \qquad \text{(Equation 1)}$$

and $$CAL'=CAL-PLASTIC\_BIAS(temperature,CAL,time) \qquad \text{(Equation 2)}$$

wherein CAL' is the improved, calibrated sensor reading or position value of the present invention, and wherein PLASTIC_BIAS(temperature, field, time) is the Plastic Bias term or plastic bias value, which is a function of temperature, field and time. Field can refer to the position data signal or other measurement dependent on gravity. In Equation 2, CAL refers back to the calculation of the prior art position value determined by the position data signal (RAW). This new PLASTIC_BIAS term cannot be determined before the sensor is put to use. The plastic bias value can be active and continuous during use based on the actual sensor environment.

Embodiments of the present invention include incorporating an initial or factory calibration of the position sensor before the step of generating the position data signal, according to prior art Equation 1. The position sensor is raised to an initial temperature for an initial amount of time so as to generate an initial position data signal. The oscillation element of the position sensor starts at a null position, and the initial position data signal corresponds to an initial amount of displacement of the oscillation element at the initial temperature for the initial amount of time. Next, the position sensor is returned to the null position according to data collected for the initial temperature and the initial amount of time. The position sensor is raised a second time to the initial temperature for the initial amount of time, and another position data signal is detected corresponding to the corresponding amount of displacement of the oscillation element. The difference between the position data signal and the another position data signal value determine SCALE(t) and BIAS(t) for the initial Plastic Bias correction to CAL, the prior art position value.

As such, the steps of initial or factory calibration can be repeated with different initial temperatures and different initial amounts of time. There can also be cooling of the position sensor between the raises to the different initial temperatures. The subsequent position of the oscillation element can be set for the next repetition according to the data collected for the different initial temperatures and the different amounts of time.

The method includes forming a calibration model based on the SCALE(t) and BIAS(t) data for the one position sensor. As in the prior art, the calibration model can be applied to other sensors assembled in the same batch as the position sensor in the initial or factory calibration. The subsequent steps of generating the position data signal, detecting the temperature data signal, and generating the position value can start the calibration to the more accurate position values. The method of the present invention is the active use of the sensor on the device, and the calibration to CAL' can be performed after an initial or factory calibration of CAL. The present invention does not require the initial or factory calibration of CAL, but the method of the present invention is compatible with sensors, which have undergone an initial or factory calibration or have a corresponding calibration model from initial or factory calibration of a test sensor.

In an alternative embodiment, the initial or factory calibration is concurrent with the method of the present invention. In the present invention, correction by the plastic bias value can be used during a calibration, in addition to taking actual readings. The steps of raising to an initial temperature, detecting an initial position data signal, returning the oscillation element to the null position, raising to the initial temperature again, detecting another position data signal, and comparing the position data signals for CAL, overlap the method of the present invention. The initial or factory calibration is also the first use of the position sensor.

The initial temperature data signal is the temperature data signal of the present invention; and the initial position data signal is the position data signal of the present invention. The completed equation is:

$$CAL' = \{[RAW*SCALE(t)] - BIAS(t)\} - PLASTIC\_BIAS(temperature, CAL, time) \quad \text{(Equation 3)}$$

wherein CAL remains determined by [RAW*SCALE(t)]−BIAS(t), concurrent with determining CAL'.

As such, the steps of initial or factory calibration and present invention can be repeated with different initial temperatures and different initial amounts of time. There can also be cooling of the position sensor between the raises to the different initial temperatures. The subsequent position of the oscillation element can be set for the next repetition according to the data collected for the different initial temperatures and the different amounts of time. The method includes forming another calibration model based on the SCALE(t), BIAS(t), PLASTIC_BIAS data for the one position sensor. The other calibration model can also be applied to other sensors assembled in the same batch as the position sensor. In the present invention, the subsequent steps of generating the position data signal, detecting the temperature data signal, and generating the position value can be repeated during use of the device.

Embodiments of the present invention include continuous calibration. Unlike factory calibrations under controlled conditions, the use of the sensor on a tool can be continuously calibrated. The duration of exposure and fluctuations of the high temperature track history of the particular position sensor for a more accurate accounting of the bias and hysteresis errors. The step of generating the position data signal comprises raising the position sensor at a first position to a first temperature for a first amount of time, generating a first position data signal at the first temperature for the first amount of time, generating the position value based on the first temperature, the first amount of time, and the first position data signal, and setting the position sensor at a second position after the first amount of time. The first position data signal is the position data signal. For continuous calibration, the steps are repeated, and the repeated step of generating the position data signal comprises raising the position sensor at the second position to a second temperature for a second amount of time, generating a second position data signal at the second temperature for the second amount of time, generating the position value based on the first position data signal, the first temperature, the first amount of time, the second position data signal, the second temperature, and the second amount of time, and setting the position sensor at a third position after the first amount of time and after the second amount of time. In this embodiment, the second position data signal is another position data signal, and the position sensor is set at third position, fourth position, and additional positions for continuous calibration and determining position values for each plastic bias value of corresponding iterations.

Another embodiment of continuous calibration is when the step of generating the position data signal comprises the steps of: raising the position sensor to a plurality of temperatures for a respective plurality of amounts of time; and generating a plurality of position data signals at each temperature for the respective amount of time. Thus, the step of generating the position value comprises the step of setting each position value based on each position data signal, respective temperature, respective amount of time, any previous position data signal, any respective previous temperature, and any respective previous amount of time. The position value is continually adjusted according to continuously generated plastic bias values based on a previous position data signal, a corresponding previous temperature, and a corresponding previous amount of time.

FIGS. 1-2 show the system 10 including the position sensor 30, the temperature sensor 40, the processor module 50, the memory module 60 and the terminal device 20. The terminal device 20 can be any device requiring position data for operation, such as a downhole tool with a drill bit 22 in the oil and gas industry, as in FIGS. 1 and 2, a survey tool for mapping locations, or a mobile probe for tracking location of the sensor or a video game controller for translating movements into game action. In FIGS. 1-2, the device 20 is a downhole tool with a drill bit 22. In this embodiment, the activity is drilling with the drill bit 22. The present invention can include any terminal device that uses location and orientation data.

The position sensor 30 is comprised of an oscillation element having a range of displacement in a set direction according to gravity. FIGS. 1-2 show the oscillation element in an orientation relative to gravity (G) and horizontal (H). In FIG. 1, the set direction (X) is shown horizontal and matching horizontal (H). In FIG. 2, the set direction (X) is shown at a pitched angle to horizontal (H). The accurate determination of X determines the orientation of the device 20 or downhole tool, so that the drilling of the drill bit 22 is on the correct path. The position sensor 30 generates a position data signal for what the oscillation element detects as X. The mechanical limitations of the oscillation element affect accuracy of the detected X data signal as the actual X of the device 20. FIGS. 1 and 2 also show the temperature sensor 40 for detecting a temperature data signal and being in proximity to the position sensor 30. The environmental conditions experienced by the position sensor 30 match the temperature sensor 40. The effect of temperature on the position sensor 30 is detected by the temperature sensor 40.

In some embodiments, the position sensor 30 can be an MMS sensor exposed to high temperatures. FIGS. 1-2 show the device 20 as a downhole tool. The environmental conditions of using the downhole tool include extreme temperatures and pressures. The mechanical components must be durable and resilient because retrieval for repair is not a simple task at great depths in the rock formation. Prior art quartz accelerometers have been used for downhole tool. However, the costs and space requirements for these accelerometers as position sensors are demanding. The present invention allows the MMS sensor to replace a quartz accelerometer without losing accuracy and durability.

FIGS. 1-2 show the schematic illustrations of the processor module 50 being in communication with the position sensor 30 and the temperature sensor 40. The processor module 50 receives the position data signal and the temperature data signal by transmission or by hard wiring. The processor module 50 generates a position value based on the position data signal for what the position sensor 30 detected as X and the temperature data signal. The memory module 60 is also a schematic illustration in communication with the processor module for storing the position data signal, the temperature data signal, and the position value.

The terminal device 20 is shown in communication with the processor module to receive the position value. There can be a control means 24 for activity corresponding to the position value. FIGS. 1-2 show a schematic control means 24 for the drilling action of the drill bit 22. In the present invention, there can be other devices, control means and activities. For example, the terminal device can be survey tool with the activity being mapping or a mobile probe with the activity being tracking or a video game controller with the activity being game movement in a virtual reality.

FIGS. 1-2 also show various alternate embodiments. There can be another position sensor 32 comprised of another oscillation element having another range of displacement in another set direction according to gravity. The other position sensor is also in proximity to the position sensor 30 and the temperature sensor 40, so that the other position data signal generated is comparable to the position data signal of the position sensor 30. The other position sensor 32 is in communication with the processor module 50, so that the position value is determined by the position data signal, the another position data signal, and the temperature data signal for further error reduction and confirmation of the detected position data of location and orientation.

A magnetometer 80 in proximity to the temperature sensor 40 and in communication with the processor module 50 is also shown in FIGS. 1-2. The magnetometer 80 generates a field data signal, which can also be used by the processor module 50 to determine an additional position value, such as compass azimuth or earth's magnetic dip. The plastic bias value for correcting the position data signal, the position data signal, and the field data signal, corresponding to magnetic field strength, determine the additional position value. Thus, the additional position value, such as azimuth, is now more accurate because of the plastic bias value. In some embodiments, there can be more than one magnetometer, such as magnetometer 82, to further compare and confirm the additional position values from other field data signals.

The present invention provides a method for determining position with improved calibration. Under extreme conditions, such as high temperatures, sensors can be calibrated to provide more accurate location information. The method allows for a terminal device to initiate activity at the properly determined location. For example, a more accurate path of the drill bit on a bottom hole assembly can be mapped for a drill bit. Also, the sensitive movement of a handheld controller can be captured for more accurate movement simulated in a video game. The position value based on orientation and location data is more accurate with the calibration of the present invention. The present invention can account for high temperature conditions of a wellbore or heat sinks from a computer system.

The method and system of the present invention calibrate a sensor, particularly an MMS sensor. Although relatively simple and inexpensive, the durability and reliability of MMS sensors has prevented the adoption of this micromachine technology in many technical fields. Bias errors and hysteresis errors could not be addressed with current systems and methods. The particularities of such small and sensitive parts required extra accommodations to insure reliability of the components. Certain conditions, such as temperature, had to be avoided in order to rely on the data from these MMS sensors. With the present invention, an MMS sensor can now be calibrated to accurately determine position. Activity can be initiated at a particular location determined by a calibrated MMS sensor.

The present invention provides a method for generating a plastic bias value for calibrating an MMS sensor. Beyond the prior art factor calibration based on the effects of temperature, the present invention gathers additional data and generates a different value to refine the readings from the sensor. The plastic bias value accounts for temperatures experienced by the sensor, time duration at each temperature, and the orientation or gravity value being detected during the exposure to those temperatures. The history of a sensor can be considered so that bias and hysteresis errors no longer reduce the reliability of the sensor. For an MMS sensor, the plastic bias values can be used to form a plastic bias model, which can be used for a batch of MMS sensors assembled under the same conditions. Although the single history of all plastic bias values of one MMS sensor will provide the most accurate data for that one MMS sensor, there is still utility for creating a plastic bias model for all MMS sensors in the batch from which the one MMS sensor was taken.

Prior art factory calibrations based on temperature remain compatible with the present invention. When the plastic bias value is determined to calibrate the MMS sensor after a factory calibration, the sensor readings still correct the sensor for bias and hysteresis and temperature. When the plastic bias value is determined concurrent with the factory calibration, the heating and cooling of the factory calibration are incorporated into the plastic bias values of the sensor. When the plastic bias value continues to be used to calibrate the MMS sensor, the sensor readings still constantly correct the sensor for bias and hysteresis.

In an embodiment of the present invention, the sensor is continuously calibrated with a plastic bias value. The real time history of the exposure of the sensor is used to calibrate so that the position values from the sensor readings are the most accurate to exactly capture what conditions were experienced by the sensor. For an MMS sensor, the reliability problems due to high temperature exposure, bias and hysteresis are now addressed so that MMS sensors can be used in more diverse applications. The activities initiated at the determined position have increased accuracy, specific to the conditions exposed to the sensor. The prior art models and extrapolations are no longer the sole basis for error correction and calibration. Furthermore, sustained activities, such as drilling, can be tracked with the increased accuracy, such that the wellbore formed can be mapped with better reliability. Real time navigation through the formation is guided by accurate position information. The continuously calibrated MMS sensor actively adjusts sensor readings for advantages and benefits beyond the prior art factory calibrations and prior art multiple sensor arrangements.

The foregoing disclosure and description of the invention is illustrative and explanatory thereof. Various changes in the details of the illustrated structures, construction and method can be made without departing from the true spirit of the invention.

We claim:

1. A method for determining position, the method comprising the steps of:
   assembling a position sensor being comprised of an oscillation element having a range of displacement in a set direction according to gravity;
   generating a position data signal with said position sensor based on an amount of displacement of said oscillation in said set direction, said position data signal corresponding to orientation of said position sensor;
   detecting a temperature data signal with a temperature sensor in proximity to said position sensor;
   communicating said position data signal and said temperature data signal to a processor module being in communication with said position sensor and said temperature sensor;
   generating a position value based on said position data signal, said temperature data signal, and duration of a temperature corresponding to said temperature data signal with said processor module;
   storing said position data signal, said temperature data signal, said duration of temperature, and said position value in a memory module in communication with said processor module;
   communicating said position value to a terminal device in communication with said processor module;
   controlling activity of said terminal device corresponding to said position value;
   generating a plastic bias value with said processor module based on said temperature data signal, said duration of said temperature, and said position data signal so as to account for bias and hysteresis errors; and
   setting said position value according to said plastic bias value, said position data signal being adjusted by said plastic bias value.

2. The method for determining position, according to claim 1, wherein said position data signal corresponds to a measurement of gravity on said oscillation element.

3. The method for determining position, according claim 1, wherein said position data signal is continually adjusted by said plastic bias value so as to continuously set said position value.

4. The method for determining position, according to claim 1, before the step of generating said position data signal, further comprising the steps of:
   raising said position sensor at a null position of said oscillation element to an initial temperature for an initial amount of time;
   detecting an initial position data signal corresponding to an initial amount of displacement of said oscillation element at the initial temperature for the initial amount of time;
   returning said position sensor to the null position according to data collected for the initial temperature and the initial amount of time;
   raising said position sensor to said initial temperature for said initial amount of time again;
   detecting another position data signal corresponding to another amount of displacement of said oscillation element at the initial temperature for the initial amount of time;
   setting said position value based on said initial position data signal and said another position data signal.

5. The method for determining position, according to claim 4, further comprising the step of:
   repeating the steps of: raising said position sensor at a null position, detecting said initial position data signal corresponding to an initial amount of displacement, returning said position sensor to the null position, raising said position sensor to said initial temperature for said initial amount of time again, detecting another position data signal, and setting said position value based on said initial position data signal and said another position data signal, with different initial temperatures and different initial amounts of time.

6. The method for determining position, according to claim 5, further comprising the step of:
   forming a calibration model based on the steps of setting said position value.

7. The method for determining position, according to claim 5, further comprising the step of:
   cooling said position sensor to a subsequent position of said oscillation element according to data collected for the different initial temperatures and the different initial amounts of time.

8. The method for determining position, according to claim 1, after the step of assembling said position sensor, wherein said position sensor at a null position of said oscillation element is raised to an initial temperature for an initial amount of time, and wherein said position data signal is an initial position data signal corresponding to an initial amount of displacement of said oscillation element at the initial temperature for the initial amount of time, the method further comprising the steps of:

returning said position sensor to the null position according to data collected for the initial temperature and the initial amount of time;

raising said position sensor to another temperature for another amount of time;

detecting another position data signal corresponding to another amount of displacement of said oscillation element at said another temperature for said another amount of time;

setting said position value based on said initial position data signal and said another position data signal; and storing said initial position data signal, said another position data signal, said position value corresponding to said initial position data signal and said another position data signal, an amount of difference between said another position data signal and said position value, temperature signal, and duration of temperature in said memory module.

9. The method for determining position, according claim 8, further comprising the step of:

repeating the steps of: returning said position sensor to the null position, raising said position sensor to said another temperature, detecting said another position data signal, setting said position value based on said initial position data signal and said another position data signal, and storing said initial position data signal, said another position data signal, said position value corresponding to said initial position data signal and said another position data signal, said amount of difference between said another position data signal and said position value, said temperature signal and said duration of temperature, with different initial temperatures and different initial amounts of time.

10. The method for determining position, according to claim 9, further comprising the step of:

forming a calibration model based on said amount of difference between said another position data signal and said position value stored in said memory module.

11. The method for determining position, according to claim 1, wherein the step of generating said position data signal comprises the steps of:

raising said position sensor at a first position to a first temperature for a first amount of time; and generating a first position data signal at the first temperature for the first amount of time, said first position data signal being said position data signal, and wherein the step of generating said position value comprises the steps of:

setting said position value based on said first temperature, said first position data signal, and said first amount of time; and setting said position sensor at a second position after the first amount of time.

12. The method for determining position, according to claim 11, further comprising the step of:

repeating the steps of: raising said position sensor at said first position, generating said first position data signal, setting said position value, and setting said position sensor at said second position.

13. The method for determining position, according to claim 11, wherein the step of generating said position data signal further comprises the steps of:

raising said position sensor at said second position to a second temperature for a second amount of time;

generating a second position data signal at the second temperature for the second amount of time, said second position data signal being another position data signal, and wherein the step of generating said position value further comprises the step of:

setting said position value based on said first position data signal, said first temperature, said first amount of time, said second position data signal, said second temperature, and said second amount of time; and setting said position sensor at a third position after the first amount of time and after the second amount of time.

14. The method for determining position, according to claim 1, wherein the step of generating said position data signal comprises the steps of:

raising said position sensor to a plurality of temperatures for a respective plurality of amounts of time; and generating a plurality of position data signals at each temperature for the respective amount of time, and wherein the step of generating said position value comprises the step of:

setting each position value based on each position data signal, respective temperature, respective amount of time, any previous position data signal, any respective previous temperature, and any respective previous amount of time.

15. A method for determining position, the method comprising the steps of:

assembling a position sensor being comprised of an oscillation element having a range of displacement in a set direction according to gravity;

generating a position data signal with said position sensor based on an amount of displacement of said oscillation in said set direction, said position data signal corresponding to orientation of said position sensor;

detecting a temperature data signal with a temperature sensor in proximity to said position sensor;

communicating said position data signal and said temperature data signal to a processor module being in communication with said position sensor and said temperature sensor;

generating a position value based on said position data signal, said temperature data signal, and duration of a temperature corresponding to said temperature data signal with said processor module;

storing said position data signal, said temperature data signal, said duration of temperature, and said position value in a memory module in communication with said processor module;

communicating said position value to a terminal device in communication with said processor module; and controlling activity of said terminal device corresponding to said position value, wherein the step of generating said position data signal comprises the steps of:

raising said position sensor to a plurality of temperatures for a respective plurality of amounts of time; and generating a plurality of position data signals at each temperature for the respective amount of time, and wherein the step of generating said position value comprises the step of:
setting each position value based on each position data signal, respective temperature, respective amount of time, any previous position data signal, any respective previous temperature, and any respective previous amount of time, and
wherein said position value is continually set according to corresponding continuous adjustments based on a previous position data signal, a corresponding previous temperature, and a corresponding previous amount of time.

16. A system for determining position, said system comprising:
a position sensor being comprised of an oscillation element having a range of displacement in a set direction according to gravity, said position sensor generating a position data signal;
a temperature sensor detecting a temperature data signal and being in proximity to said position sensor;
a processor module being in communication with said position sensor and said temperature sensor, said processor module receiving said position data signal and said temperature data signal, said processor module generating a position value based on said position data signal and said temperature data signal, according to the method of claim 1;
a memory module being in communication with said processor module, said memory module storing said position data signal, said temperature data signal, and said position value; and
a terminal device being in communication with said processor module and receiving said position value, said terminal device being comprised of a control means for activity corresponding to said position value.

17. The system for determining position, according to claim 16, further comprising:
another position sensor being comprised of another oscillation element having another range of displacement in another set direction according to gravity, said another position sensor generating another position data signal, said another position sensor being in proximity to said temperature sensor and being in communication with said processor module, said processor module receiving said another position data signal, said processor module generating said position value based on said position data signal, said another position data signal, and said temperature data signal.

18. The system for determining position, according to claim 16, further comprising:
a magnetometer being in proximity to said temperature sensor, being in communication with said processor module, and generating a field data signal, said processor module receiving said field data signal, said processor module generating an additional position value based on said field data signal, said position data signal, and said temperature data signal.

19. The system for determining position, according to claim 18, further comprising:
another magnetometer being in proximity to said temperature sensor, being in communication with said processor module, and generating another field data signal, said processor module receiving said another field data signal, said processor module generating said additional position value based on said field data signal, said another field data signal, said position data signal, and said temperature data signal.

* * * * *